United States Patent
Lee et al.

(10) Patent No.: US 7,272,110 B2
(45) Date of Patent: Sep. 18, 2007

(54) METHOD OF ALLOCATING WALSH CODE RESOURCE

(75) Inventors: Young Jo Lee, Seoul (KR); Young Woo Yoon, Kunpo-shi (KR); Jong Hoe An, Seoul (KR); Suk Hyon Yoon, Seoul (KR); Cheol Woo You, Seoul (KR)

(73) Assignee: LG Electronics Inc., Seoul (KR)

( * ) Notice: Subject to any disclaimer, the term of this patent is extended or adjusted under 35 U.S.C. 154(b) by 1169 days.

(21) Appl. No.: 10/255,640

(22) Filed: Sep. 27, 2002

(65) Prior Publication Data

US 2003/0063588 A1  Apr. 3, 2003

(30) Foreign Application Priority Data

Sep. 29, 2001 (KR) .................. 10-2001-60965
Nov. 10, 2001 (KR) .................. 10-2001-69972

(51) Int. Cl.
*H04J 11/00* (2006.01)

(52) U.S. Cl. ..................... 370/209; 370/335

(58) Field of Classification Search ............ 370/209, 370/342, 335, 441, 442
See application file for complete search history.

(56) References Cited

U.S. PATENT DOCUMENTS

| | | | | |
|---|---|---|---|---|
| 5,461,639 A | * | 10/1995 | Wheatley et al. | 370/342 |
| 6,137,789 A | * | 10/2000 | Honkasalo | 370/342 |
| 6,930,981 B2 | * | 8/2005 | Gopalakrishnan et al. | 370/252 |
| 6,996,056 B2 | * | 2/2006 | Chheda et al. | 370/209 |

* cited by examiner

*Primary Examiner*—Chi Pham
*Assistant Examiner*—Phuc Tran
(74) *Attorney, Agent, or Firm*—Ked & Associates, LLP

(57) ABSTRACT

The present invention relates to a mobile communication system, and more particularly, to a method of allocating a Walsh code resource. The present invention includes determining an available maximum data rate by comparing a channel information value of a forward link with a first threshold value, determining a data rate based on a quantity of data to be transmitted, terminating to allocate the walsh codes or determining a number of the walsh codes to be requested for the data according to a comparison between the data rates, and determining a number of walsh codes for other terminals by checking a number of remaining walsh codes excluding the number of the requested walsh codes from available walsh codes.

26 Claims, 7 Drawing Sheets

FIG. 4

| data rate [Kb/s] | EP= 3840bits slot number per sub-packet | EP= 3072bits slot number per sub-packet | EP= 2304bits slot number per sub-packet | EP= 1536bits slot number per sub-packet | EP= 768bits slot number per sub-packet | EP= 384bits slot number per sub-packet |
|---|---|---|---|---|---|---|
| 38.4 | N.A. | N.A. | N.A. | N.A. | N.A. | 8 |
| 76.8 | N.A. | N.A. | N.A. | N.A. | 8 | 4 |
| 153.6 | N.A. | N.A. | N.A. | 8 | 4 | 2 |
| 230.4 | N.A. | N.A. | 8 | N.A. | N.A. | N.A. |
| 307.2 | N.A. | 8 | N.A. | 4 | 2 | 1 |
| 384 | 8 | N.A. | N.A. | N.A. | N.A. | N.A. |
| 460.8 | N.A. | N.A. | 4 | N.A. | N.A. | N.A. |
| 614.4 | N.A. | 4 | N.A. | 2 | 1 | N.A. |
| 768 | 4 | N.A. | N.A. | N.A. | N.A. | N.A. |
| 921.6 | N.A. | N.A. | 2 | N.A. | N.A. | N.A. |
| 1228.8 | N.A. | 2 | N.A. | 1 | N.A. | N.A. |
| 1536 | 2 | N.A. | N.A. | N.A. | N.A. | N.A. |
| 1843.2 | N.A. | N.A. | 1 | N.A. | N.A. | N.A. |
| 2457.6 | N.A. | 1 | N.A. | N.A. | N.A. | N.A. |
| 3072 | 1 | N.A. | N.A. | N.A. | N.A. | N.A. |

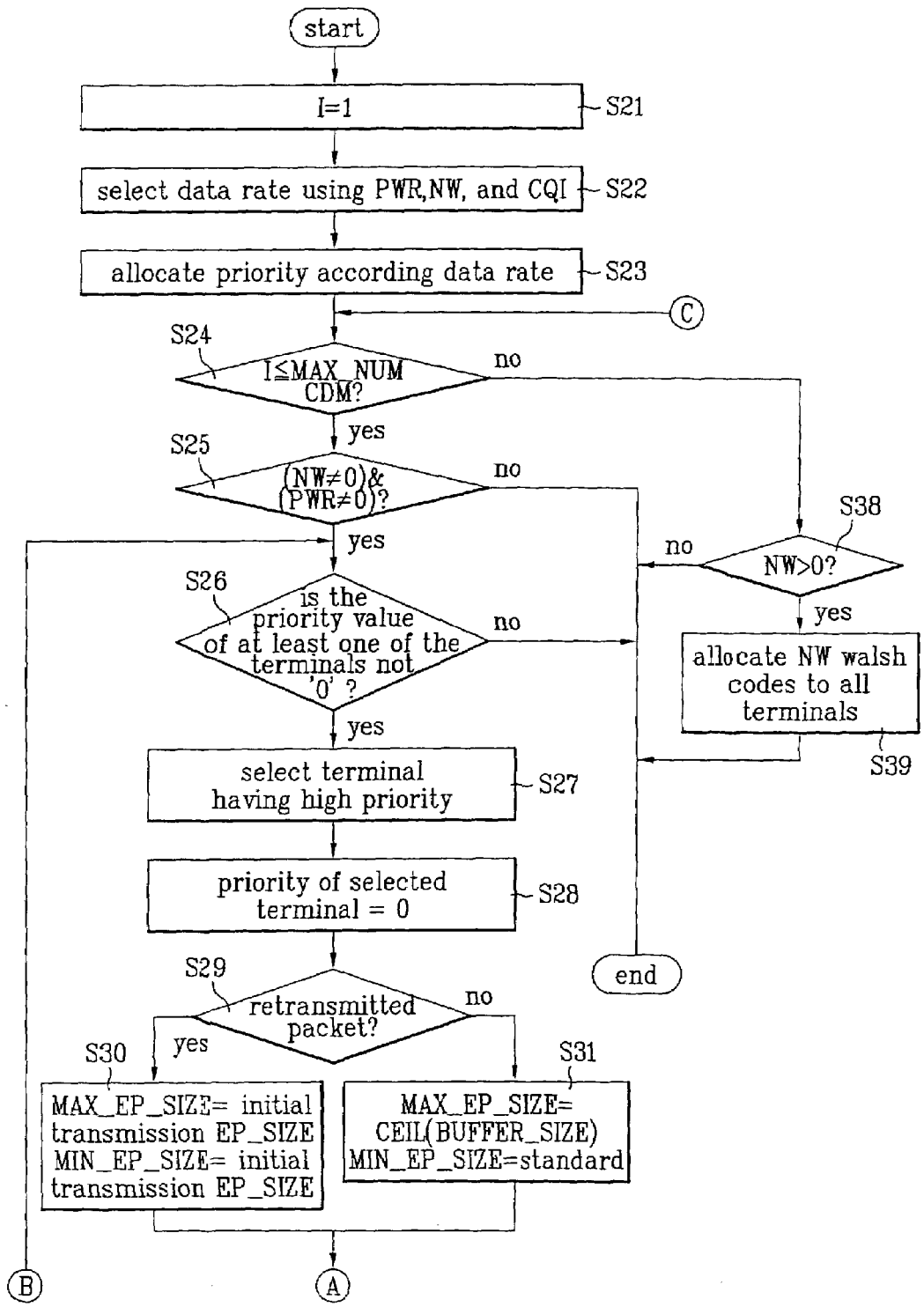

METHOD OF ALLOCATING WALSH CODE RESOURCE

This application claims the benefit of the Korean Application Nos. P01-60965 filed on Sep. 29, 2001 and P01-69972 filed on Nov. 10, 2001, which is hereby incorporated by reference.

BACKGROUND OF THE INVENTION

1. Field of the Invention

The present invention relates to a mobile communication system, and more particularly, to a method of allocating a Walsh code resource.

2. Discussion of the Related Art

Generally, a wireless communication environment is a channel varied due to positions and mobility of terminals, which requires an adaptation method for the variable channel. A method for efficiently using a wireless channel and transmitting data at a high speed in the wireless channel environment varied with the passage of time is divided into a method for accepting variations of a channel and adaptively changing a modulation type and a method for varying channel coding.

In order to reduce an error rate by adding redundant information data by using channel coding, it is essential to increase data transmitted to the wireless channel. Since the wireless communication environment is a channel varied due to positions and mobility of terminals, it may be good or poor.

Therefore, when the wireless communication environment is good, a lot of information data are transmitted using a high code rate coding that reduces redundancy, thereby increasing a data rate. When the wireless communication environment is poor, low code rate coding which increases redundancy to reduce errors is employed to be resistant to noise and decrease a data rate.

On the other hand, when the wireless communication environment is good, a transmission method which can transmit data at a high speed such as quadrature amplitude modulation (QAM) for transmitting a few information bits in one transmission symbol or multiple phase shift keying (MPSK) is employed for modulation, and when the wireless communication environment is poor, a transmission method which is resistant to interference noise but has a low data rate such as binary phase shift keying (BPSK) is used for modulation.

In order to adaptively change modulation and coding according to variations of the channel environment, it is necessary to transmit channel environment information from a receiver for estimating the channel environment in the above-described modulation methods.

In addition, a mobile communication system for packet transmission uses hybrid automatic repeat request (HARQ). The HARQ combines automatic repeat request (ARQ) and forward error correction (FEC) so as to improve reliability and throughput in the data transmission of the communication system.

When an error is generated in received information due to the channel environment, the ARQ requests repeat of the same information until the information does not have an error, thereby improving reliability. The FEC uses an error correcting code to correct an error generated due to the channel environment. In case the channel environment maintains so good a condition that frequency of errors can be reduced, the ARQ can control it. However, when the channel environment is deteriorated, frequency of errors is increased in the received information and a number of repeat requests is increased, which results in a low throughput of the system. Accordingly, the HARQ that combines the ARQ and the FEC has been suggested.

Incremental redundancy (IR) is one of the HARQ. A transmitter generates a sequence encoded with an arbitrarily low data rate from data bits and then transmits a portion of the sequences to the receiver. Whenever the receiver requests the transmitter to retransmit the sequence, the transmitter further transmits only redundant bits. Accordingly, the receiver combines the previously transmitted portion of the sequence and the redundant bits, and decodes the combined bits. As a result, the IR can obtain gains due to the combination, and adaptively reduce redundancy according to the channel environment by gradually decreasing the coding rate in every repeat.

A system that requires high-speed data transmission uses time division multiplexing (TDM) for scheduling a terminal for transmitting data in every frame section in consideration of the channel environment and transmitted data. When one terminal is selected to transmit data in every frame section, if an amount of data to be transmitted is small but the channel environment is good, the code efficiency on a Walsh code space is deteriorated. Here, the Walsh code space indicates a set of Walsh codes.

Therefore, efficiency of the system can be improved by employing code division multiplexing/time division multiplexing (CDM/TDM) for transmitting data to another terminal by using remaining Walsh codes, when there are some Walsh codes remained after allocating a portion available Walsh codes to one terminal in each frame section.

As a result, there is required a method for selecting a terminal for transmitting data in the CDM/TDM system having higher resource efficiency than the TDM system, determining an optimal number of Walsh codes for the terminal, and determining an optimal data rate for using the Walsh codes.

SUMMARY OF THE INVENTION

Accordingly, the present invention is directed to a method for allocating a Wash code resource that substantially obviates one or more problems due to limitations and disadvantages of the related art.

An object of the present invention is to provide a method of allocating a Walsh code resource in a communication system that efficiently uses Walsh codes.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for allocating walsh code resource includes the steps of (a) determining an available maximum data rate by comparing a channel information value of a forward link with a first threshold value, (b) determining a data rate based on a quantity of data to be transmitted, (c) terminating to allocate the walsh codes or determining a number of the walsh codes to be requested for the data according to a comparison between the data rates, and (d) determining a number of walsh codes for other terminals by checking a number of remaining walsh codes excluding the number of the requested walsh codes from available walsh codes.

Preferably, it further includes the steps of replacing a new number of the available walsh codes with the number of the remaining walsh codes if the number of the remaining walsh codes is equal or more than a second threshold value, repeating the steps (a), (b), and (c), and determining the number of the walsh codes for other terminals using the number of the newly available walsh codes.

Preferably, it further includes replacing the number of the requested walsh codes with a number of the available walsh codes if the number of the remaining walsh codes is less than the second threshold value, and terminating to allocate the walsh codes.

In another aspect of the present invention, a method for allocating walsh code resource in a mobile communication system using a time division multiplexing and a code division multiplexing method includes (a) determining a data rate for each terminal using forward link channel information, an available power level for a transmission, a number of available walsh codes, (b) allocating a priority to each terminal according to its determined data rate, (c) determining an encoder packet size and/or a number of transmission slots for a terminal selected first according to the priority, and (d) determining a number of walsh codes requested for the selected terminal based on forward link channel information from the selected terminal, the determined encoder packet size, a predetermined or the determined number of the transmission slots.

Preferably, it further includes the steps of deciding whether data for the selected terminal is retransmission data or not, determining a minimum and maximum encoder packet size according to the decision, and further determining the number of the transmission slots if the selected terminal is initially selected.

Preferably, if further includes the steps of comparing the forward link channel information to a threshold value, and determining the number of walsh codes requested for the selected terminal based on forward link channel information from the selected terminal, the determined encoder packet size, a predetermined or the determined number of the transmission slots or selecting a terminal with a lower priority.

Preferably, it further includes the steps of comparing a number (A) of code-division-multiplexed terminals including a terminal to be selected with a predetermined maximum number (B) of code-division-multiplexed terminals at a same transmission period, selecting a terminal according to the priority where A is equal or less than B and there is the available walsh codes and the available power level, and distributing the available walsh codes to all terminals where A is greater than B and there is the available walsh codes.

Preferably, it further includes the steps of calculating a power level for a data transmission based on the determined number of the requested walsh codes, the available power level for a transmission, the number of available walsh codes, updating the available power level by using the calculated power level, updating the number of the available walsh codes by using the determined number of the requested walsh codes, and repeating the steps (c) and (d).

In another aspect of the present invention, a method for allocating walsh code resource includes the steps of determining a number of walsh codes requested for a data transmission by using available walsh codes, a data rate determined using a quantity of transmission data, and an availably maximum data rate determined using channel information from a scheduled terminal.

In another aspect of the present invention, a method for allocating walsh code resource includes the steps of determining a data rate for each of a plurality of terminals, allocating a priority to each terminal according to the transmission based on forward link channel information, a length of transmission slots, and an encoder packet size for transmission data to a terminal to be selected according to the priority.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 illustrates a number of slots per sub packet by a data rate in accordance with the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention suggests a method of selecting a data rate by using feedback information from a receiver and a method for determining a number of Walsh codes in the CDM/TDM system in order to efficiently use a mobile communication system.

In addition, the present invention suggests a method for selecting a terminal by the order of priority, and determining a number of Walsh codes that will be allocated to the selected terminal.

It is assumed that payload sizes of data bits intended to be currently transmitted are 384 bits, 768 bits, 1536 bits, 2304 bits, 3072 bits and 3840 bits. In FIG. 4, the payload size is referred to as EP.

FIG. 4 shows usable data rates assumed in each payload size (EP). Here, N.A implies non-analysis. In the aforementioned IR, one packet includes fixed length or variable length sub packets, and the sub packets are formed through repetition of coded sequences having a predetermined length to apply the HARQ.

FIRST EMBODIMENT

Figure 1:
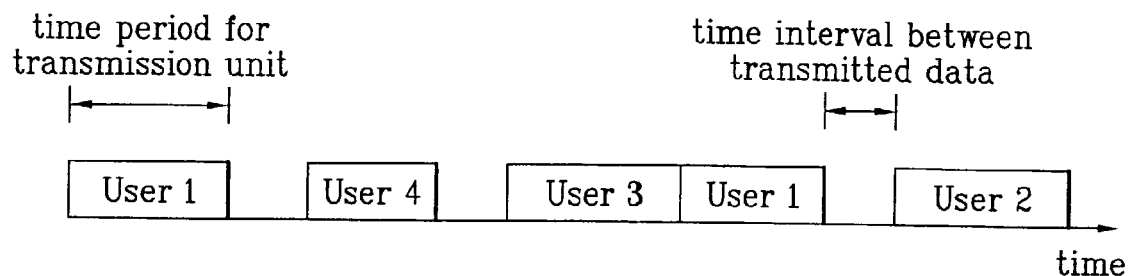
FIG. 1 illustrates one example of data transmission using general TDM.
Figure 2:
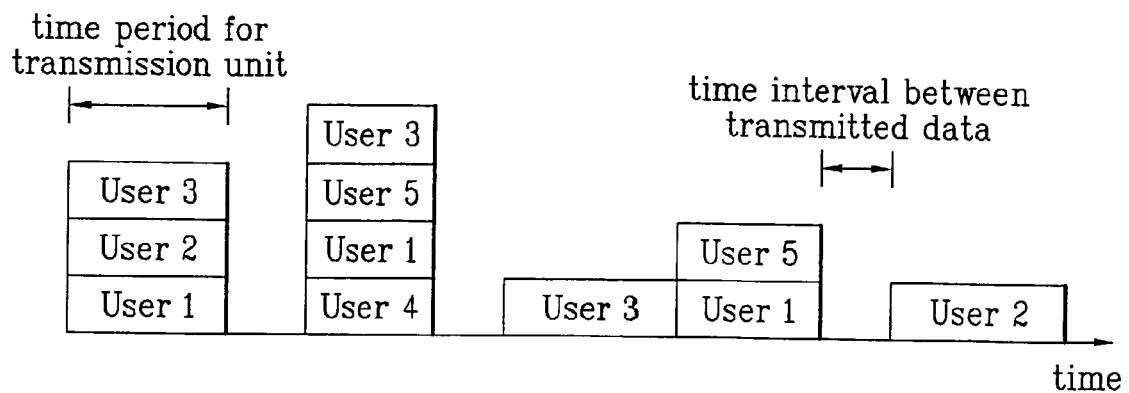
FIG. 2 illustrates one example of data transmission using general CDM/TDM.
Figure 3:
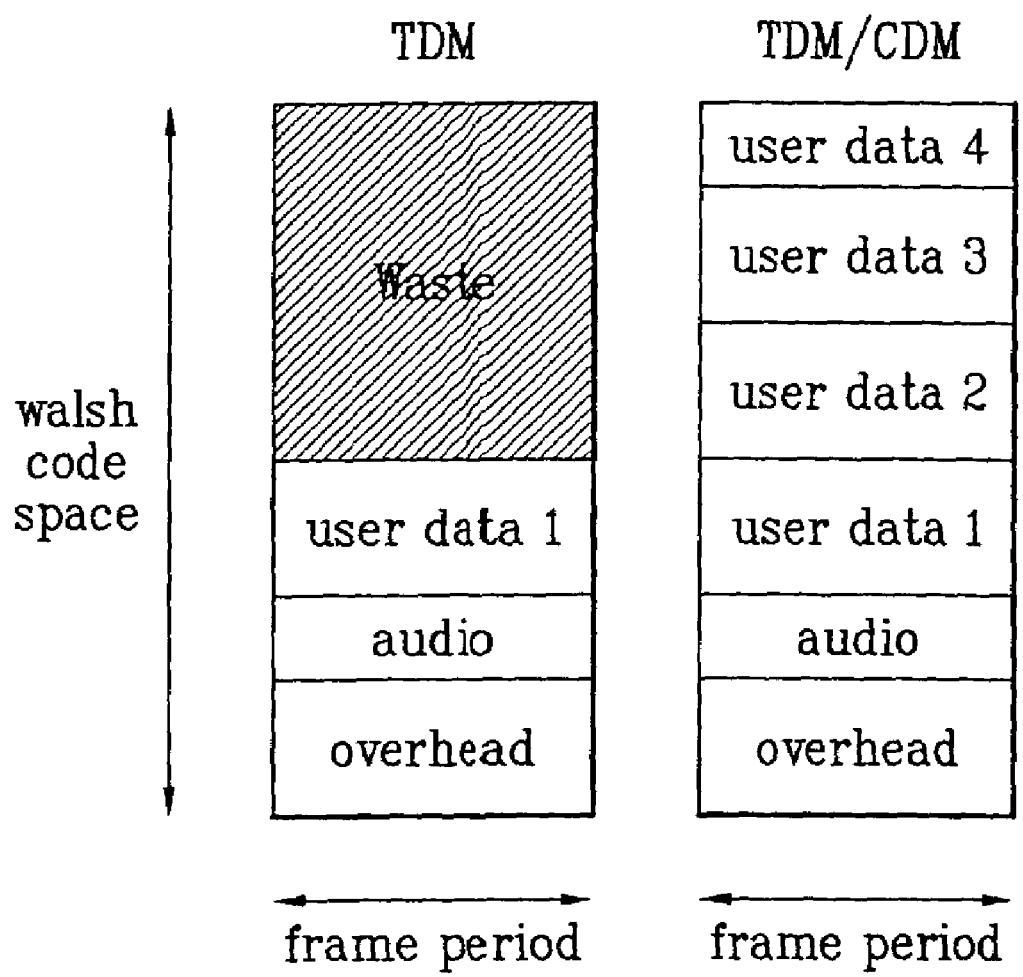
FIG. 3 illustrates comparison in Wash code efficiency between a TDM system and a CDM/TDM system.
Figure 5:
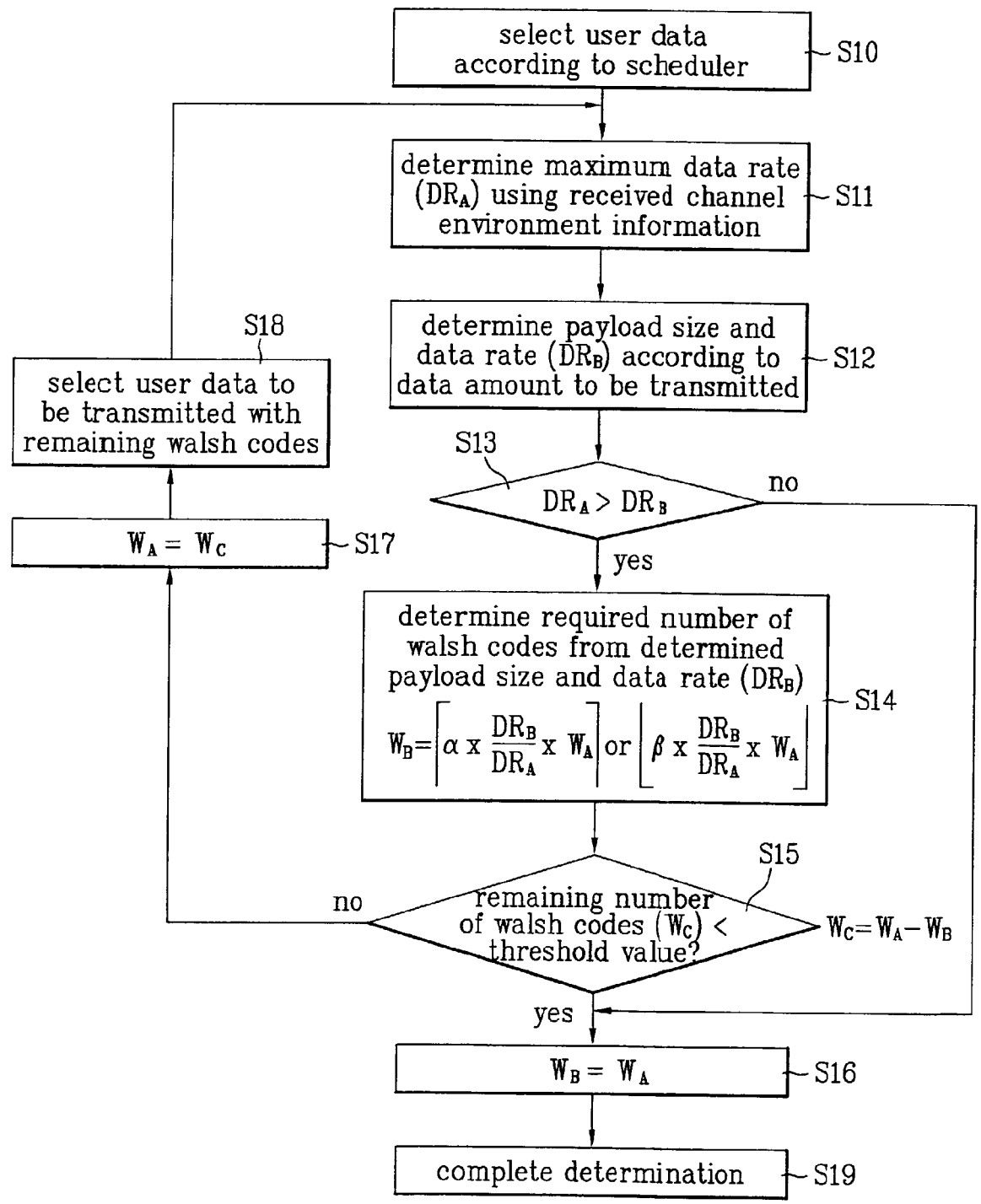
FIG. 5 illustrates a procedure for selecting a data rate in FIG. 4 and a number of Walsh codes by the data rate.

FIG. 5 illustrates a procedure for selecting a data rate in FIG. 4 and a number of Walsh codes by the data rate.

A scheduler of a base station selects a terminal for transmitting data in each frame by using channel environment feedback information (C/I) from terminals and transmission data information (step S10).

When selection of the terminal for transmitting data is finished, the scheduler selects a maximum data rate (DRA) in FIG. 4 by using the C/I from the corresponding terminal (step S11). Here, a number of threshold values which must be compared to determine the DRA are represented by 'number of slots per packet (4)×payload size (6)', namely 24. As shown in FIG. 4, some of the 24 data rates are same. Since the same data rates have similar threshold values, they can be grouped. 15 data rates exist in the current system, and thus 15 threshold values exist therein.

Accordingly, the base station compares the received C/I with the 15 threshold values, thereby determining the DRA (step S12).

When determination of the DRA is finished, the base station checks data required to be transmitted, determines a payload size, and also determines a corresponding data rate DRB.

The base station confirms whether the DRB by the payload size is smaller than the DRA by the C/I from the terminal (step S13).

When the DRB is smaller than the DRA, the base station determines the required number of Walsh codes (WB) according to the DRA, DRB and the current usable number of Walsh codes (WA) (step S14). When the DRB is smaller than the DRA, it implies that the current channel environment is better than the channel environment requiring the transmission data rate. Therefore, fewer Walsh codes than the usable number of Walsh codes (WA) are necessary. Here, the required number of Walsh codes (WB) is calculated by considering parameters such as the DRA, DRB, WA and code rate.

The required number of Walsh codes (WB) is represented by the following equation 1.

[Equation 1]

$$W_B = \left\lceil \alpha \times \frac{DR_B}{DR_A} \times W_A \right\rceil \text{ or } W_B = \left\lfloor \beta \times \frac{DR_B}{DR_A} \times W_A \right\rfloor$$

Here, α and β represent constants, $\lceil x \rceil$ is indicates the largest integer less than or equal to x, and $\lfloor x \rfloor$ indicates the smallest integer greater or equal to x. indicates the smallest integer greater or equal to x.

When $\lceil x \rceil$ is used, Walsh codes are sufficiently allocated to terminals, and when $\lfloor x \rfloor$ is used, the used number of Walsh codes is minimized.

For convenience shake, the required number of Walsh codes (WB) can be restricted to a multiple of 2, a multiple of 3, a multiple of 4, a multiple of 5 or a multiple of 6.

When determination of the required number of Walsh codes (WB) is finished in S14, if the remaining number of Walsh codes (WC=WA−WB) is equal to or greater than the threshold value, the remaining number of Walsh codes (WC) is substituted for the usable number of Walsh codes (WA) (step S17).

After the remaining number of Walsh codes (WC) is substituted for the usable number of Walsh codes (WA), the scheduler of the base station selects a new data terminal according to the C/I from the terminal, data information and the remaining number of Walsh codes (step S18).

When determination of the required number of Walsh codes (WB) is finished in S14, if the remaining number of Walsh codes (WC=WA−WB) is less than the threshold value, the required number of Walsh codes (WB) is substituted for the usable number of Walsh codes (WA) (step S16).

When determination of the required number of Walsh codes (WB) is finished in S14, if the remaining number of Walsh codes (WC=WA−WB) is smaller than the threshold value, the usable number of Walsh codes (WA) is substituted for the required number of Walsh codes (WB) (step S16).

In the same manner, when the DRB is not smaller than the DRA in S13, namely equal to or greater than the DRA, the usable number of Walsh codes (WA) is substituted for the required number of Walsh codes (WB) (step S1).

Thereafter, the procedure from S11 is repeated on the newly-selected data terminal until the conditions are satisfied.

It is thus possible to efficiently use the remaining Walsh codes.

SECOND EMBODIMENT

Figure 6B:
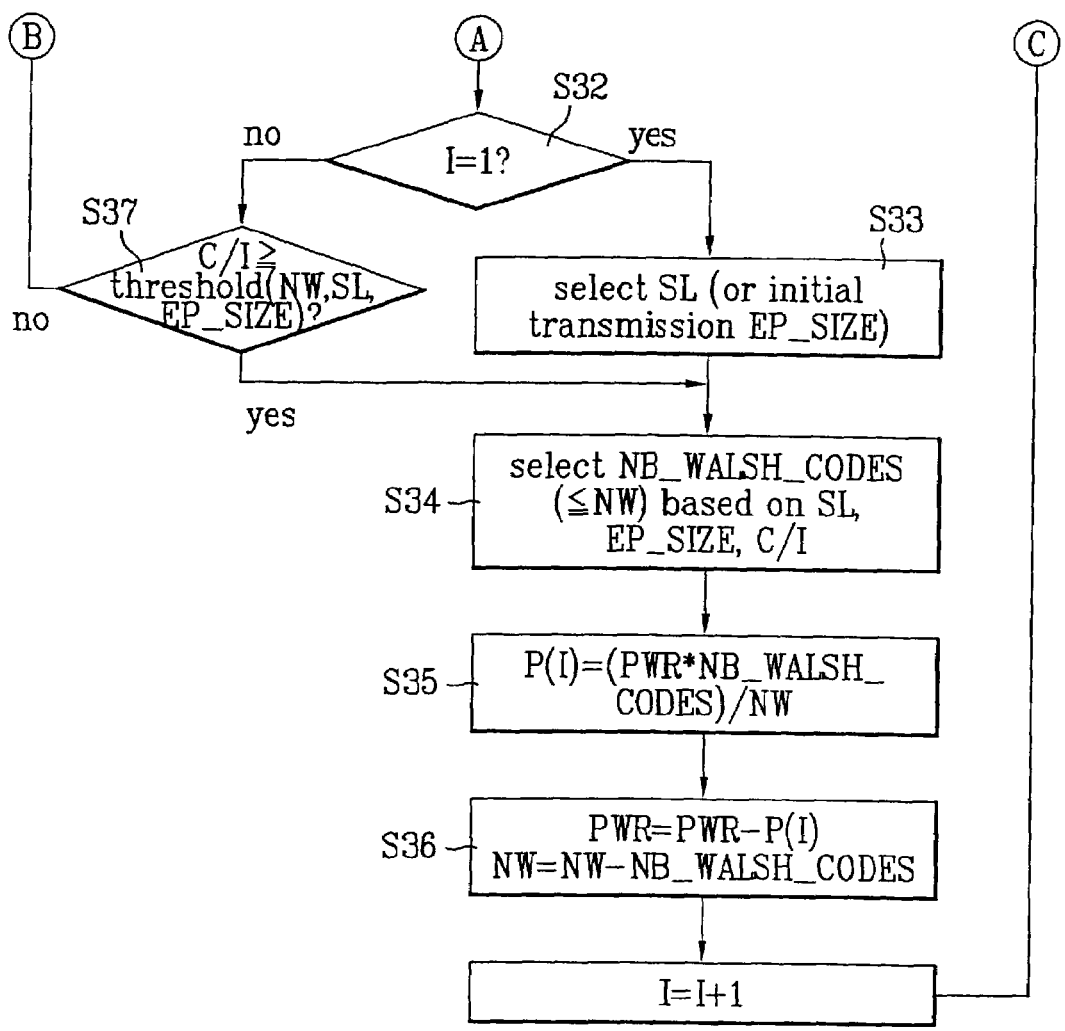
FIG. 6 illustrates a procedure for selecting a terminal, a data rate of the terminal and a number of Walsh codes.

FIG. 6 illustrates a procedure for selecting a terminal, a data rate of the terminal and a number of Walsh codes.

Referring to FIG. 6, the value 'I' that represents the order of terminals (CDM terminals) is set to '1' (step S21). Here, the value 'I' is used as a variable for counting the number of terminals that can simultaneously transmit data at the same time point.

Thereafter, the data rates for the whole terminals are determined by using PWR, NW and CQI information (step S22). At this time, it is presumed that the whole Walsh codes are allocated to one terminal.

Here, PWR represents the power usable in a forward packet data channel (F-PDCH), NW is the number of 32-chips Walsh codes usable for the F-PDCH, and CQI denotes a channel quality indicator.

The scheduler allocates priority values to the respective terminals by reflecting the data rates obtained at the step S22 (step S23). Note that priority value can be some number except zero.

That is, the higher the data rate is, the higher priority value is allocated, while the lower the data rate is, the lower priority value is allocated.

If the value 'I' is equal to or smaller than the number of CDM terminals (MAX_NUM_CDM) which can maximally transmit data at the same time point set in the system, it is judged whether NW and PWR are '0' (step S25). If NW is greater than '0' in a state that 'I' is greater than MAX_NUM_CDM at the step S24 (step S38), NW remaining Walsh codes are allocated to the scheduled CDM terminals (step S39), and the whole procedure is ended.

If NW and PWR are not '0', is the priority value of at least one of the terminals not '0'?" (step S26). However, if NW or PWR is '0', the whole procedure is ended.

If the priority value of at least one of the terminals is not '0', the terminal of the highest priority is selected (step S27). However, when the priority values of the whole terminals are '0', the whole procedure is ended.

The priority of the selected terminal is set to '0' (step S28).

It is judged if the packet to be transmitted to the terminal selected due to its highest priority at the step S27 is the retransmitted packet (step S29), and if it is judged that the packet is the retransmitted packet, the maximum size of the encoder packet MAX_EP_SIZE and the minimum size of the encoder packet MIN_EP_SIZE are set to the size of the encoder packet EP_SIZE used for the initially transmitted packet (step S30). However, if it is judged that the packet is the initially transmitted packet, the maximum size of the encoder packet MAX_EP_SIZE is set to the maximum integer $BUFFER_{size}$ that does not exceed the buffer size, and the minimum size of the encoder packet MIN_EP_SIZE is set to the minimum size of the encoder packet determined in the standard (step S31).

The maximum or minimum size of the encoder packet coincides with the payload size of FIG. 5 in meaning.

After the sizes of the encoder packets are determined at the step S30 or S31, it is judged if 'I' is '1' (step S32), and if it is judged that 'I' is '1', the slot length SL is selected using the channel environment information C/I received from the respective terminals (step S33). If the packet is the initially transmitted packet, the size of the encoder packet EP_SIZE should be also selected. At this time, it is assumed that all the Walsh codes are allocated to one terminal. If the received C/I is larger, the transmission period of SL becomes shorter, while if the C/I is smaller, the transmission period becomes longer.

If it is judged that 'I' is not '1' at the step S32, it is judged whether the value of the channel environment information C/I received from the respective terminals is larger than or equal to the threshold value (which is varied according to NW, SL, and EP_SIZE) (step S37). If it is judged that the C/I is larger than or equal to the threshold value, the minimum number of Walsh codes NB_WALSH_CODES required for the I-th CDM terminal is determined using the channel environment information C/I received from the respective terminal (step S34). However, if it is judged that the C/I is not larger than or equal to the threshold value, it is judged again if the priority value is '0', and then the following processes are repeated.

The slot lengths of the respective terminals code-multiplexed in one transmission unit period through the process at the steps S33 and S34 become equal.

NB_WALSH_CODES represents the minimum number of Walsh codes required for a certain frame error rate (FER).

Using the number of Walsh codes NB_WALSH_CODES determined at the step S34, PWR, and NW, the power strength used in the I-th CDM terminal is obtained using the following equation 2 (step S35).

$$P(I)=PWR*NB\_WALSH\_CODES/NW \quad \text{[Equation 2]}$$

With reference to a result of calculating the equation 2, the strength of the remaining power that can be used for F-FDCH is calculated using the following equations 3 and 4 (step S36).

$$PWR=PWR-P(I) \quad \text{[Equation 3]}$$

$$NW=NW-NB\_WALSH\_CODES \quad \text{[Equations 4]}$$

After the strength of the remaining power that can be used for F-FDCH is calculated, the value of 'I' is increased by 1, and it is judged whether 'I' is smaller than or equal to the maximum number of CDM terminals (step S24), and then the following processes are repeated.

At the step S39, the allocation of NW Walsh codes remaining in the scheduled CDM terminals is performed through the following three methods.

First is a method of allocating remaining Walsh codes equally to all the CDM terminals. For example, if the remaining number of Walsh codes is larger than or equal to that of the CDM terminal, an additional one-by-one allocation of the Walsh codes to all the CDM terminals is performed. This procedure is repeatedly performed until the remaining number of Walsh codes becomes smaller than that of the CDM terminals.

If the remaining number of Walsh codes is smaller than that of the CDM terminals, the Walsh codes are additionally allocated one-by-one to the CDM terminals in the order of their priority.

Figure 7:
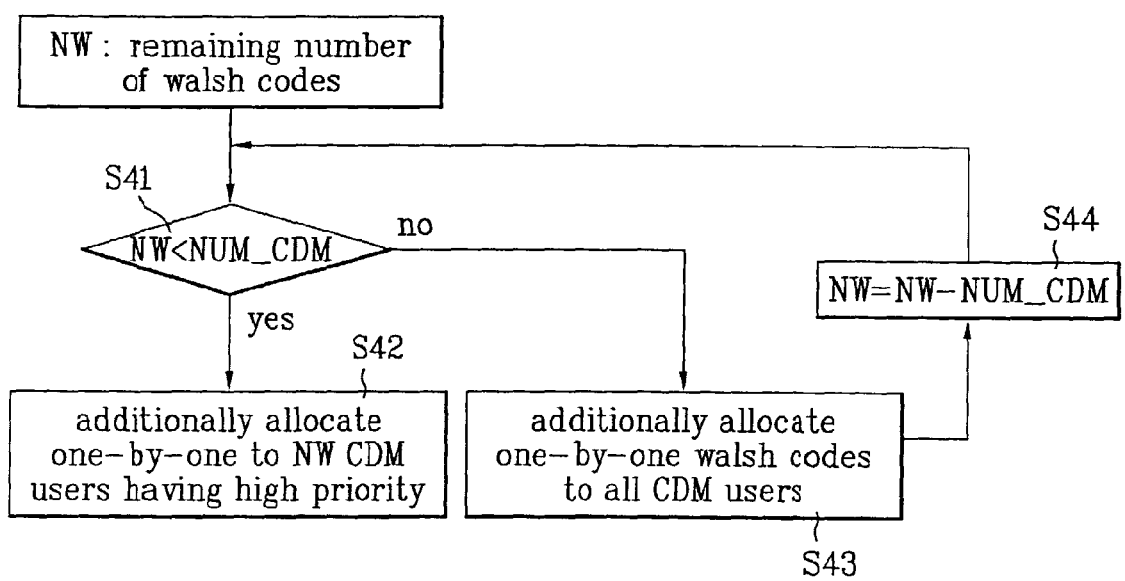
FIG. 7 illustrates a method of equally allocating remaining Walsh codes to CDM terminals in accordance with the present invention.

The first example is illustrated in FIG. 7.

FIG. 7 is a view illustrating the method of equally allocating the remaining Walsh codes to the CDM terminals according to an embodiment of the present invention.

That is, it is judged if NW is smaller than the number of CDM terminals NUM_CDM (step S41), and if it is judged that NW is smaller than the number of CDM terminals, the Walsh codes are additionally allocated one-by-one to the NW CDM terminals having the high priority (step S42). However, if NW is larger than or equal to the number of CDM terminals (NUM_CDM), the Walsh codes are additionally allocated one-by-one to all the CDM terminals (step S43). Also, NW is updated by subtracting NUM_CDM from NW (step S44), and then it is judged again if the updated NW is smaller than NUM_CDM (step S41).

Second is a method of allocating all the remaining Walsh codes to the CDM terminal having the highest priority.

Third is a method of allocating the remaining number of Walsh codes in proportion to the number of Walsh codes NB_WALSH_CODES allocated to the respective terminals. For example, if the remaining number of Walsh codes is NW, the number of CDM terminals is n, and the number of Walsh codes NB_WALSH_CODES allocated to the respective CDM terminals corresponds to NB_WALSH_CODES1, NB_WALSH_CODES2, , , , , NB_WALSH_CODESn, the additionally allocated number of Walsh codes is calculated. If the number of Walsh codes additionally allocated to the respective CDM terminals corresponds to AW1, AW2, ..., AWn, AW1 is calculated as 'NW*round{NB_WALSH_CODES1/(NB_WALSH_CODES1+NB_WALSH_CODES2+ ... +NB_WALSH_CODESn)}', and AW2 is calculated as '(NW−AW1)*round{NB_WALSH_CODES2/(NB_WALSH_CODES2+ ... +NB_WALSH_CODESn)}'. Also, AWn-1 is calculated as '(NW−AW1−AW2− ... −Awn-2)*round{NB_WALSH_CODESn-1/(NB_WALSH_CODESn-1+NB_WALSH_CODESn)}', and AWn is calculated as '(NW−NW1−NW2− ... −Awn−1)'. Here, 'round' means a round off.

In the third embodiment, 'round', 'ceil', 'floor', etc., may be used, and the order of calculation for the respective CDM terminals may be in the order of the priority or the allocated number of Walsh codes NB_WALSH_CODES.

As described above, according to the present invention, the data transmission rate is determined using the feedback information from the receiver, the number of Walsh codes of the user is optimally determined for each frame in the TDM/CDM system, and the data is transmitted to another user using the remaining number of Walsh codes. Thus, the present invention can improve the system efficiency.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method for allocating walsh codes, comprising the steps of:
   (a) determining a first data rate of an available maximum data rate by comparing a channel information value of a forward link with a first threshold value;
   (b) determining a second data rate based on a quantity of data to be transmitted;
   (c) determining a number of requested walsh codes for the data according to a comparison between the first data rate and the second data rates; and
   (d) allocating walsh codes to other terminal according to a number of walsh codes for the other terminal determined by checking a number of remaining walsh codes excluding the number of the requested walsh codes from available walsh codes.

2. The method of claim 1, wherein the number of the requested walsh codes is determined using the first data rate and the second data rate and a number of the available walsh codes.

3. The method of claim 2, wherein the number of the requested walsh codes is determined by applying the number of the available walsh codes to a ratio of the first data rate and the second data rate.

4. The method of claim 1, wherein first threshold values are differently set according to forward link channel information, a payload size, and a number of slots per subpacket to determine the first data rate.

5. The method of claim 1, wherein first threshold values are identically set for same data rates, different payload sizes, and different numbers of slots per subpacket to determine the first data rate.

6. The method of claim 1, the step (d) comprising:
   replacing a new number of the available walsh codes with the number of the remaining walsh codes if the number of the remaining walsh codes is equal or more than a second threshold value;
   repeating the steps (a), (b), and (c); and
   determining the number of the walsh codes for other terminals using the new number of the available walsh codes.

7. The method of claim 1, the step (d) comprising:
   replacing the number of the requested walsh codes with a number of the available walsh codes if the number of the remaining walsh codes is less than a second threshold value; and
   terminating to allocate the walsh codes.

8. A method for allocating walsh codes in a mobile communication system using a time division multiplexing and a code division multiplexing method, the method comprising the steps of:
   (a) determining a data rate for each terminal using forward link channel information, an available power level for a transmission, a number of available walsh codes;
   (b) allocating a priority to each terminal according to its determined data rate;
   (c) determining an encoder packet size and/or a number of transmission slots for a terminal selected first according to the priority; and
   (d) determining a number of walsh codes requested for the selected terminal based on forward link channel information from the selected terminal, the determined encoder packet size, a predetermined or the determined number of the transmission slots.

9. The method of claim 8, the step (c) further comprising:
   deciding whether data for the selected terminal is retransmission data or not;
   determining a minimum and maximum encoder packet size according to the decision; and
   further determining the number of the transmission slots if the selected terminal is initially selected.

10. The method of claim 9, wherein a minimum and a maximum encoder packet size of initial transmission data for the retransmission data is used if the transmission data of the selected terminal is the retransmission data.

11. The method of claim 9, wherein a predetermined minimum and a maximum encoder packet size is used where the data is initial transmission data.

12. The method of claim 9, wherein a predetermined number of the transmission slots is used where the selected terminal is initially selected.

13. The method of claim 8, the step (d) further comprising:
   comparing the forward link channel information to a threshold value; and
   determining the number of walsh codes requested for the selected terminal based on forward link channel information from the selected terminal, the determined encoder packet size, a predetermined or the determined number of the transmission slots or selecting a terminal with a lower priority.

14. The method of claim 13, the threshold value varies according to the number of the available walsh codes, the number of the transmission slots, and the encoder packet size.

15. The method of claim 8, the step (b) further comprising:
   comparing a number (A) of code-division-multiplexed terminals including a terminal to be selected with a predetermined maximum number (B) of code-division-multiplexed terminals at a same transmission period;
   selecting a terminal according to the priority where A is equal or less than B and there is the available walsh codes and the available power level; and
   distributing the available walsh codes to all terminals where A is greater than B and there is the available walsh codes.

16. The method of claim 15, wherein further distributing remaining walsh codes according to the priority after uniformly distributing the available walsh codes to the all terminals.

17. The method of claim 15, wherein further distributing remaining walsh codes to a terminal with a highest priority after uniformly distributing the available walsh codes to the all terminals.

18. The method of claim 15, wherein distributing the available walsh codes in proportion to a number of pre-allocated walsh codes to each terminal.

19. The method of claim 8, the step (d) further comprising:
   calculating a power level for a data transmission based on the determined number of the requested walsh codes, the available power level for a transmission, the number of available walsh codes;
   updating the available power level by using the calculated power level;
   updating the number of the available walsh codes by using the determined number of the requested walsh codes; and
   repeating the steps (c) and (d).

20. A method for allocating walsh codes, comprising:

determining a number of requested walsh codes for a transmission data to a scheduled terminal by using available walsh codes, a data rate determined using a quantity of the transmission data, and an available maximum data rate determined using channel information from the scheduled terminal; and allocating walsh codes to another terminal according to a number of walsh codes for the other terminal determined by checking a number of remaining walsh codes excluding the number of the requested walsh codes from the available walsh codes.

21. The method of claim 20, further comprising:

determining a number of walsh codes requested for at least one terminal by using the number of the remaining walsh codes excluding the requested walsh codes from the available walsh codes, wherein the at least one terminal is scheduled for simultaneously transmitting data with others.

22. The method of claim 20, wherein the transmission data is transmitted through a packet shared-channel.

23. The method of claim 20, further comprising:

comparing the data rate to the available maximum data rate.

24. A method for allocating walsh codes, comprising:

determining a data rate for each of a plurality of terminals;

allocating a priority to each terminal according to the determined data rate; and determining a number of walsh codes requested for a data transmission based on forward link channel information, a length of transmission slots, and an encoder packet size for transmission data to a terminal to be selected according to the priority.

25. The method of claim 24, further comprising:

determining a power level for the data transmission according to the number of the requested walsh codes for the data transmission, a number of available walsh codes, and an available power level for the selected terminal.

26. The method of claim 24, wherein the data rate is determined by the forward link channel information, a number of available walsh codes, and an available power level.

* * * * *